United States Patent [19]
Bonner et al.

[11] Patent Number: 6,144,970
[45] Date of Patent: Nov. 7, 2000

[54] TECHNIQUE FOR INPLACE REORGANIZATION OF A LOB TABLE SPACE

[75] Inventors: Charles Roy Bonner, San Jose; Robert William Lyle, Morgan Hill, both of Calif.

[73] Assignee: International Business Machines Corporation, Armonk, N.Y.

[21] Appl. No.: 09/322,316

[22] Filed: May 28, 1999

Related U.S. Application Data

[60] Provisional application No. 60/101,729, Sep. 24, 1998.

[51] Int. Cl.⁷ .................................................. G06F 17/30
[52] U.S. Cl. .............................. 707/206; 707/2; 711/170
[58] Field of Search ................. 707/206, 2; 395/182.02; 711/170

[56] References Cited

U.S. PATENT DOCUMENTS

| | | | |
|---|---|---|---|
| 4,509,119 | 4/1985 | Gumaer et al. | 711/136 |
| 4,695,949 | 9/1987 | Thatte et al. | 707/206 |
| 4,807,120 | 2/1989 | Courts | 707/206 |
| 4,949,388 | 8/1990 | Bhaskaran | 382/159 |
| 4,961,134 | 10/1990 | Crus et al. | 707/8 |
| 5,043,866 | 8/1991 | Myre, Jr. et al. | 707/202 |
| 5,088,036 | 2/1992 | Ellis et al. | 707/206 |
| 5,136,706 | 8/1992 | Courts | 707/206 |
| 5,222,235 | 6/1993 | Hintz et al. | 707/101 |
| 5,247,672 | 9/1993 | Mohan | 711/152 |
| 5,261,088 | 11/1993 | Baird et al. | 707/206 |
| 5,291,583 | 3/1994 | Bapat | 395/705 |
| 5,295,188 | 3/1994 | Wilson et al. | 380/30 |
| 5,396,623 | 3/1995 | McCall et al. | 707/101 |
| 5,408,654 | 4/1995 | Barry | 707/101 |
| 5,416,915 | 5/1995 | Mattson et al. | 711/114 |
| 5,418,921 | 5/1995 | Cortney et al. | 711/114 |
| 5,418,940 | 5/1995 | Mohan | 714/5 |
| 5,435,004 | 7/1995 | Cox et al. | 707/205 |
| 5,452,299 | 9/1995 | Thessin et al. | 370/260 |

(List continued on next page.)

FOREIGN PATENT DOCUMENTS 8-167852  6/1996  Japan .

OTHER PUBLICATIONS

IBM Technical Disclosure Bulletin, "Fine Granularity Locking to Support High Data Availability in a Client/Server Database Management System," vol. 38, No. 02, pp. 143–145, Feb. 1995.

Joon Seek Kim, et al., "Mapping Parameter Estimation Using Integral Projections And Segmented Moving Objects in Object–Oriented Analysis–Synthesis Coding," Optical Engineering, vol. 35, No. 1, pp. 156–165, Jan. 1996.

MJ Carey, et al., "Object And File Management in the EXODUS Extensible Database System," Proceedings of Very Large Data Bases. Twelfth International Conference on Very Large Data Bases, Kyoto, Japan, pp. 91–100, Aug. 25–28, 1986.

ML McAuliffe, et al., "Towards Effective and Efficient Free Space Management," 1996 ACM SIGMOD International Conference on Management of Data, Montreal, Quebec, Canada, Jun. 4–6, 1996.

(List continued on next page.)

*Primary Examiner*—Thomas G. Black
*Assistant Examiner*—Charles L. Rones
*Attorney, Agent, or Firm*—Pretty, Schroeder & Poplawski, P.C.

[57] ABSTRACT

A apparatus, apparatus, and article of manufacture for a computer implemented inplace reorganization system. Data in a database is stored on a data storage device connected to a computer is reorganized. Large object data that needs to be reorganized within a table space is identified. One or more chunks in the table space are allocated to the identified large object data. In particular, a combination of full and partial chunks of space within the table space are allocated to contain the reorganized large object data. Then, the large object data is moved into the allocated chunks to reorganize the large object data inplace. Furthermore, the free space at the end of the table space may be reclaimed.

72 Claims, 13 Drawing Sheets

U.S. PATENT DOCUMENTS

| | | |
|---|---|---|
| 5,455,944 | 10/1995 | Haderle et al. ............................ 707/202 |
| 5,517,641 | 5/1996 | Barry et al. ............................... 707/101 |
| 5,560,003 | 9/1996 | Nilsen et al. ............................. 707/206 |
| 5,566,329 | 10/1996 | Gainer et al. ................................. 707/4 |
| 5,579,499 | 11/1996 | Fecteau et al. ........................... 711/209 |
| 5,579,515 | 11/1996 | Hintz et al. .................................. 707/7 |
| 5,630,093 | 5/1997 | Holzhammer et al. .................. 711/115 |
| 5,666,560 | 9/1997 | Moertl et al. ............................... 710/68 |
| 5,684,986 | 11/1997 | Moertl et al. ............................. 707/101 |
| 5,687,343 | 11/1997 | Fecteau et al. ........................... 711/202 |
| 5,721,915 | 2/1998 | Sockut et al. ............................. 707/200 |
| 5,727,197 | 3/1998 | Burgess et al. ............................. 707/2 |
| 5,732,402 | 3/1998 | Lehman .................................... 707/205 |
| 5,737,601 | 4/1998 | Jain et al. ................................. 707/201 |
| 5,742,806 | 4/1998 | Reiner et al. ................................ 707/3 |
| 5,742,810 | 4/1998 | Ng et al. ....................................... 707/4 |
| 5,748,952 | 5/1998 | Chadha et al. ............................... 707/2 |
| 5,758,357 | 5/1998 | Barry et al. .............................. 707/202 |
| 5,761,667 | 6/1998 | Koeppen .................................. 707/101 |
| 5,857,210 | 1/1999 | Tremblay et al. ........................ 707/206 |
| 5,909,540 | 6/1999 | Carter et al. ........................ 395/182.02 |
| 5,963,982 | 10/1999 | Goldman ................................. 711/170 |

OTHER PUBLICATIONS

C. Mohan, "Disk Read–Write Optimizations and Data Integrity in Transaction Systems Using Write–Ahead Logging," Proceedings of the Eleventh International Conference on Data Engineering (Cat. No. 95CH35724), Taipei, Taiwan, Mar. 6–10, 1995.

Ki Sik Pang, et al., "An Efficient Recovery Scheme For Large Data in Multimedia DBMS," Journal of the Korea Information Science Society, vol. 22, No. 2, pp. 206–217, Feb. 1995.

C. Mohan, et al., "Algorithms For Flexible Space Management in Transaction Systems Supporting Fine–Granularity Locking," Advances in Database Technology—EDBT '94. 4th International Conference on Extending Database Technology, Cambridge, UK, Mar. 28–31, 1994.

Martin Marshall, "Time Warner Big on Oracle Objects. (Testing Oracle 8's Ability to Move Large Object Blocks)," (Company Operations), (Brief Article), CommunicationsWeek Issue: n676, pp. 1–3, Aug. 11, 1997.

HweeHwa Pang, "Tertiary Storage in Multimedia Systems: Staging or Direct Access?", Multimedia Systems, vol. 5, Issue: 6, pp. 386–399, Dec. 1, 1997.

Dr. Michael Stonebraker, "The Empire Strikes Back: DB2 Universal Database," http://www.oreview.com/9704side-.htm, pp. 1–7, 1997.

GH Sokut, "A Method For On–Line Reorganization of a Database," IBM Systems Journal, vol.. 36, No. 3 pp. 411–436, 1997.

H. Koide, et al., "A New Memory Allocation Method For Shared Memory Multiprocessors With Large Virtual Address Space," Concurrency:Practice and Experience, vol. 9, No. 9, pp. 897–914, Sep. 1997.

IBM Technical Disclosure Bulletin, "Method For Storing Large Objects in a Relational Database," vol. 35, No. 4A, pp. 72–75, Sep. 1992.

IBM Technical Disclosure Bulletin, "Reorganization Flags For Table Indexes," vol. 35, No. 5, pp. 156–157, Oct. 1992.

IBM Technical Disclosure Bulletin, "Technique to Allow DB2 Utilities and Commands to Run While SQL Applications Have a Table Space Locked," vol. 36, No. 09A, pp. 499–501, Sep. 1993.

IBM Technical Disclosure Bulletin, "Spanning Temporary Reorg Files," vol. 36, N. 06A, p. 159, Jun. 1993.

IBM Technical Disclosure Bulletin, "Segmented Relational Database Tables," vol., 38, No. 07, pp. 219–220, Jul. 1995.

IBM Technical Disclosure Bulletin, "Mapping a Relational Database to a Hierarchical File System," vol. 38, No. 10, pp. 309–311, Oct. 1995.

LOB Map 500

| Starting Page Number 502 | Count of Pages in this Section 504 |
|---|---|
| 20 | 1 |
| 1000 | 16 |
| ... | ... |

*FIG. 5*

| Starting Page Number | Count of Pages in this Section |
|---|---|
| 20 | 1 |
| 1000 | 16 |
| 50 | 2 |
| 416 | 8 |
| 400 | 7 |

*FIG. 9A*

| Deferred Deallocation List |
|---|
| 20 |
| 50 |
| 51 |
| 416 |
| 417 |
| 418 |
| 419 |
| 420 |
| 421 |
| 422 |
| 423 |
| 400 |
| 401 |
| 402 |
| 403 |
| 404 |
| 405 |
| 406 |

*FIG. 9B*

| Starting Page Number | Count of Pages in this Section |
|---|---|
| 300 | 16 |
| 1000 | 16 |
| 600 | 2 |

TECHNIQUE FOR INPLACE REORGANIZATION OF A LOB TABLE SPACE

PROVISIONAL APPLICATION

This application claims the benefit of U.S. Provisional Application No. 60/101,729, entitled "IMPROVED DATABASE SYSTEM," filed on Sep. 24, 1998, by Charles R. Bonner et al., attorney's reference number ST9-98-046, which is incorporated by reference herein.

CROSS-REFERENCE TO RELATED APPLICATIONS

This application is related to the following copending and commonly-assigned patent applications:

application Ser. No. 09,322,312, entitled "USING AN EPOCH NUMBER TO OPTIMIZE ACCESS WITH ROWID COLUMNS AND DIRECT ROW ACCESS," filed on same date herewith, by Robert W. Lyle et al., currently pending;

application Ser. No. 09,321,675, entitled "A FAST TECHNIQUE FOR RECOVERING AN INDEX ON AN AUXILIARY TABLE," filed on same date herewith, by Robert W. Lyle et al., currently pending;

application Ser. No. 09,322,292, entitled "STORING AN UNCOMPRESSED DATA LENGTH IN A LOB MAP TO SPEED SUBSTRING ACCESS WITHIN A LOB VALUE," filed on same date herewith, by Robert W. Lyle et al., currently pending;

application Ser. No. 09,322,287, entitled "A TECHNIQUE TO AVOID PROCESSING WELL CLUSTERED LOB'S DURING REORGANIZATION OF A LOB TABLE SPACE," filed on same date herewith, by Charles R. Bonner et al., currently pending;

application Ser. No. 09,322,317, entitled "AN OPTIMIZED TECHNIQUE FOR PREFETCHING LOB TABLE SPACE PAGES," filed on same date herewith, by Charles R. Bonner et al. currently pending;

application Ser. No. 09,322,286, entitled "A TECHNIQUE FOR CREATING A UNIQUE QUASI-RANDOM ROW IDENTIFIER," filed on same date herewith, by Robert W. Lyle et al., currently pending;

application Ser. No. 09,322,698, entitled "A TECHNIQUE FOR DETERMINING AN AGE OF AN OLDEST READING TRANSACTION WITHIN A DATABASE OBJECT," filed on same date herewith, by Robert W. Lyle et al. currently pending;

application Ser. No. 09,322,315, entitled "AN EFFICIENT TECHNIQUE TO DEFER LARGE OBJECT ACCESS WITH INTERMEDIATE RESULTS," filed on same date herewith, by Christine M. Lee et al., currently pending;

each of which is incorporated by reference herein.

BACKGROUND OF THE INVENTION

1. Field of the Invention

This invention relates in general to computer-implemented database systems, and, in particular, to inplace reorganization of a table space.

2. Description of Related Art

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples or records. A database will typically have many tables and each table will typically have multiple tuples and multiple columns. Tables are assigned to table spaces. A table space is associated with direct access storage devices (DASD), and, thus, tables are stored on DASD, such as magnetic or optical disk drives for semi-permanent storage.

A table space can be a system managed space (e.g., an operating system file system) or a database managed space. Each table space is physically divided into equal units called data pages or pages. Each page, which typically contains 4K bytes, holds one or more rows of a table and is the unit of input/output (I/O). The rows of a table are physically stored as records on a page. A record is always fully contained within a page and is limited by page size. As users move towards working with image data and other large data objects, storing data in conventional records becomes difficult.

An index is an ordered set of references to the records or rows in a database file or table. The index is used to access each record in the file using a key (i.e., one of the fields of the record or attributes of the row). However, building an index for a large file can take a considerable amount of elapsed time. The process involves scanning all records in the file, extracting a key value and record identifier (rid) value from each of the records, sorting all of the key/rid values, and then building the index from the sorted key/rid values. Typically, the scanning, sorting, and index build steps are performed serially, which can be time consuming in the case of a large database file. When a RDBMS stores LOBs, an index is typically used to access the LOBs efficiently.

Traditionally, a RDBMS stored simple data, such as numeric and text data. In a traditional RDBMS, the underlying storage management has been optimized for simple data. More specifically, the size of a record is limited by the size of a page, which is a fixed number (e.g., 4K) defined by a computer developer. This restriction in turn poses a limitation on the length of columns of a table. To alleviate such a restriction, most computer developers today support a new built-in data type for storing large objects (LOBs). Large objects, such as image data, typically take up a great deal of storage space.

If there is a clustering index defined, the DBMS will attempt to insert the record in the same order as the clustering keys. Maintaining data records in the clustering key order enables more efficient data retrieval when the clustering index is used to retrieve a set of records within a key range.

As data is added to and deleted from tables in a table space, the data may not be well organized. For example, there may be many small gaps of free space (i.e., space into which records may be inserted), which are not useful when large amounts of free space are needed. To resolve this, conventional systems enable a table space to be reorganized so that the data in the table space is better organized. For example, data may be reorganized sequentially. Some conventional systems perform reorganization of data by unloading every row out of the table space and then loading each row back into the table space so that the data is organized better. This is a non-inplace reorganization, as it moves data out of the table space, into another space, and the reloads the data back into the table space.

Unloading and reloading a table space has several problems. First, at least twice as much DASD space as is required for the table space is required to perform a non-inplace reorganization. Generally, LOB table spaces are used to store LOB values. Thus, LOB table spaces are very large and management of the work space is a usability problem.

Second, reading and writing every row of the table space to reclaim less than 100% of the free space is an unnecessary cost. Free space refers to the space that may be used for new records to be stored. Reclaiming free space is a reference to shifting data so that the free space is at the end of the table space. For example, if there are 500 cylinders of physical space for a table space, and if 400 cylinders contain data, but there is 100 cylinders of free space dispersed throughout the 500 cylinders, reclaiming would move the data so that the last 100 cylinders contained all of the free space.

Therefore, there is a need in the art for an improved technique for reorganization of a table space.

SUMMARY OF THE INVENTION

To overcome the limitations in the prior art described above, and to overcome other limitations that will become apparent upon reading and understanding the present specification, the present invention discloses a method, apparatus, and article of manufacture for a computer implemented inplace reorganization system.

In accordance with one embodiment of the invention, data in a database is stored on a data storage device connected to a computer is reorganized. Large object data that needs to be reorganized within a table space is identified. One or more chunks in the table space are allocated to the identified large object data. Then, the large object data is moved into the allocated chunks to reorganize the large object data inplace.

In accordance with another embodiment of the invention, data in a database is stored on a data storage device connected to a computer is reorganized. Initially, large object data that needs to be reorganized within a table space is identified. Full chunks and partial chunks of space within the table space are allocated to contain the reorganized large object data. The large object data is moved into the allocated full chunks and partial chunks of space to reorganize the large object data inplace. Then, the free space at the end of the table space is reclaimed.

BRIEF DESCRIPTION OF THE DRAWINGS

Referring now to the drawings in which like reference numbers represent corresponding parts throughout:

FIG. 5 is block diagram illustrating an exemplary LOB map;

FIGS. 9A–9D are diagrams illustrating an example of rechunking;

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
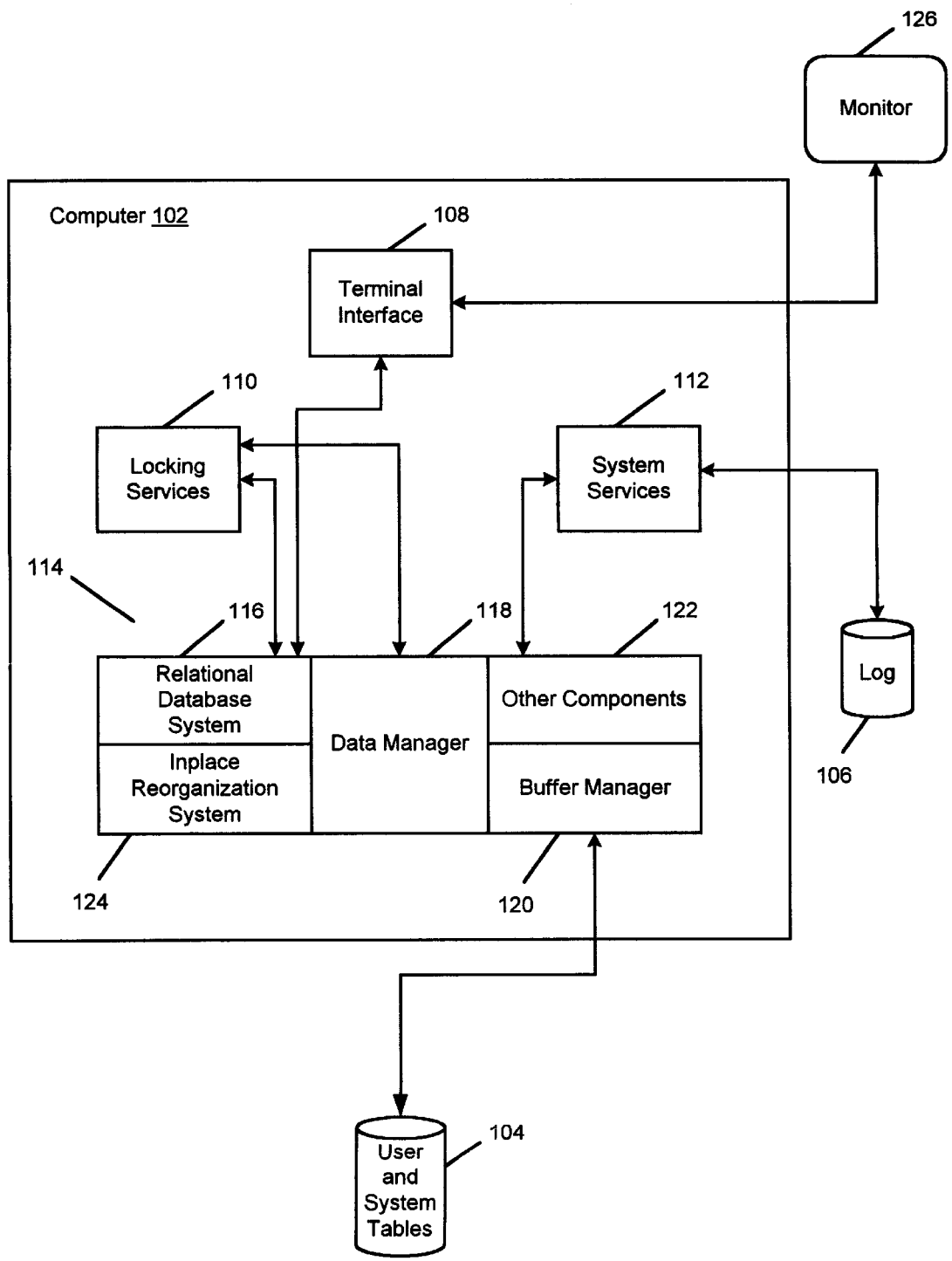
FIG. 1 is a block diagram illustrating an exemplary computer hardware environment that could be used in accordance with the present invention.

FIG. 1 is a block diagram illustrating an exemplary computer hardware environment that could be used in accordance with the present invention. In the exemplary environment, a computer system 102 is comprised of one or more processors connected to one or more data storage devices 104 and 106 that store one or more relational databases, such as a fixed or hard disk drive, a floppy disk drive, a CDROM drive, a tape drive, or other device.

Operators of the computer system 102 use a standard operator interface 108, such as IMS/DB/DC®, CICS®, TSO®, OS/390®, ODBC® or other similar interface, to transmit electrical signals to and from the computer system 102 that represent commands for performing various search and retrieval functions, termed queries, against the databases. In the present invention, these queries conform to the Structured Query Language (SQL) standard, and invoke functions performed by Relational DataBase Management System (RDBMS) software.

The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data.

In the preferred embodiment of the present invention, the RDBMS software comprises the DB2® product offered by IBM for the OS/390® operating systems. Those skilled in the art will recognize, however, that the present invention has applications to any RDBMS software, whether or not the RDBMS software uses SQL.

As illustrated in FIG. 1, the DB2® system for the OS/390® operating system includes three major components: the Internal Resource Lock Manager (IRLM) 110, the Systems Services module 112, and the Database Services module 114. The IRLM 110 handles locking services for the DB2® system, which treats data as a shared resource, thereby allowing any number of users to access the same data simultaneously. Thus concurrency control is required to isolate users and to maintain data integrity. The Systems Services module 112 controls the overall DB2® execution environment, including managing log data sets 106, gathering statistics, handling startup and shutdown, and providing management support.

At the center of the DB2® system is the Database Services module 114. The Database Services module 114 contains several submodules, including the Relational Database System (RDS) 116, the Data Manager 118, the Buffer Manager 120, the Inplace Reorganization System 124, and other components 122 such as an SQL compiler/interpreter. These submodules support the functions of the SQL language, i.e. definition, access control, interpretation, compilation, database retrieval, and update of user and system data. The Inplace Reorganization System 124 works in conjunction with the other submodules to reorganize data inplace.

The present invention is generally implemented using SQL statements executed under the control of the Database Services module 114. The Database Services module 114 retrieves or receives the SQL statements, wherein the SQL statements are generally stored in a text file on the data storage devices 104 and 106 or are interactively entered into the computer system 102 by an operator sitting at a monitor 126 via operator interface 108. The Database Services module 114 then derives or synthesizes instructions from the SQL statements for execution by the computer system 102.

Generally, the RDBMS software, the SQL statements, and the instructions derived therefrom, are all tangibly embodied in a computer-readable medium, e.g. one or more of the data storage devices 104 and 106. Moreover, the RDBMS software, the SQL statements, and the instructions derived therefrom, are all comprised of instructions which, when read and executed by the computer system 102, causes the computer system 102 to perform the steps necessary to implement and/or use the present invention. Under control of an operating system, the RDBMS software, the SQL statements, and the instructions derived therefrom, may be loaded from the data storage devices 104 and 106 into a memory of the computer system 102 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Inplace Reorganization of a Table Space

The inplace reorganization system 124 of the present invention reorganizes a LOB table space without unloading and reloading the data in the LOB table space. Thus, the reorganization technique of the present invention is referred to as inplace. That is, the reorganization technique is an inplace reorganization because data is moved from within the LOB table space to reclaim space and rechunk LOBS.

When data in the LOB table space does not have to be unloaded and reloaded, very little, or no additional DASD space is required.

The inplace reorganization system 124 organizes LOBs into chunks. A chunk is at least one page. In one embodiment of the invention, a full chunk is a set of contiguous pages, and a partial chunk is a portion of that set of contiguous pages. The inplace reorganization system uses 16 pages for a chunk as a trade off between performance and fragmentation. However, 16 pages is used for illustration only, and a chunk could be defined as containing more than or less than 16 pages. A LOB is considered "well organized" or "well clustered" or "well inserted" when the LOB is allocated to only full chunks and at most one partial chunk. The term "chunking" is used to refer to maintaining LOB pages in contiguous groups of 16 LOB pages, which form blocks, and allocating LOBs to these blocks. For example, a LOB that is allocated to 160 LOB pages is well inserted if the LOB is stored in 10 chunks. Similarly, a LOB that is allocated to 23 LOB pages is well inserted if the LOB is stored in 2 blocks, with one chunk containing 16 full pages of LOB data and the second chunk containing 7 full pages of LOB data. The second chunk is partially full as some pages are not used.

To reorganize data in the table space inplace, the inplace reorganization system performs "rechunking", which is the process of allocating chunks to a LOB so that the LOB is allocated to as few chunks as possible. In addition, the "organization state" (i.e., the "chunked" or "rechunked" state) is maintained for each LOB. If a LOB has been chunked when initially inserted or rechunked during reorganization, the LOB is well inserted. Thus, during another reorganization of a table space, the inplace reorganization system 124 recognizes that the well inserted LOB does not need to be reorganized. When a LOB is updated, the LOB is deallocated and then re-inserted, and, preferably, well inserted (i.e., inserted in as few chunks as possible).

One of the advantages of rechunking is that LOB pages are moved to gain effective prefetch (i.e., retrieval of LOB pages just prior to their use). In particular, a LOB map identifies the pages to which a LOB is allocated. The pages need not be contiguous. Using the LOB map, the data manager system 118 identifies data pages for prefetch. For example, if a LOB is allocated to page 20, 1000, and 50, the PFPL would contain entries for 20, 1000, and 50. When LOB pages are to be prefetched, the data manager system 118 uses the PFPL to prefetch LOB pages. Similarly, the inplace reorganization system 124 can use the PFPL to prefetch LOB low-level space map pages. The PFPL is explained in further detail in the above cross-referenced application entitled "AN OPTIMIZED TECHNIQUE FOR PREFETCHING LOB TABLE SPACE PAGES". For each LOB, effective prefetching is attained by placing non-contiguous LOB pages adjacent to one another in "chunks". The chunks allocated to the LOB do not have to be contiguous for prefetch to work effectively.

Another reason to reorganize a table space is to reestablish clustering. Maintaining clustering is done to optimize prefetching during database access. The inplace reorganization system 124 describes a technique to reorganize LOB pages, with a minimum amount of page movement, that can effectively use prefetch.

A pageset is a set of pages that are grouped together. As data is inserted or deleted from the pageset, gaps of free space occur. By moving data to the free space at the front of a pageset, free space at the end of the pageset is "reclaimed". Thus, when rechunking, the inplace reorganization system 124 moves data in LOB pages directly to free pages near the beginning of the pageset until all free pages are used. The data in LOB pages is moved to free space only if necessary, thus minimizing LOB page movement.

LOB Table Space Organization

Prior to discussing the technique of the embodiment of the present invention, a discussion of LOB table spaces will be provided.

Figure 2:
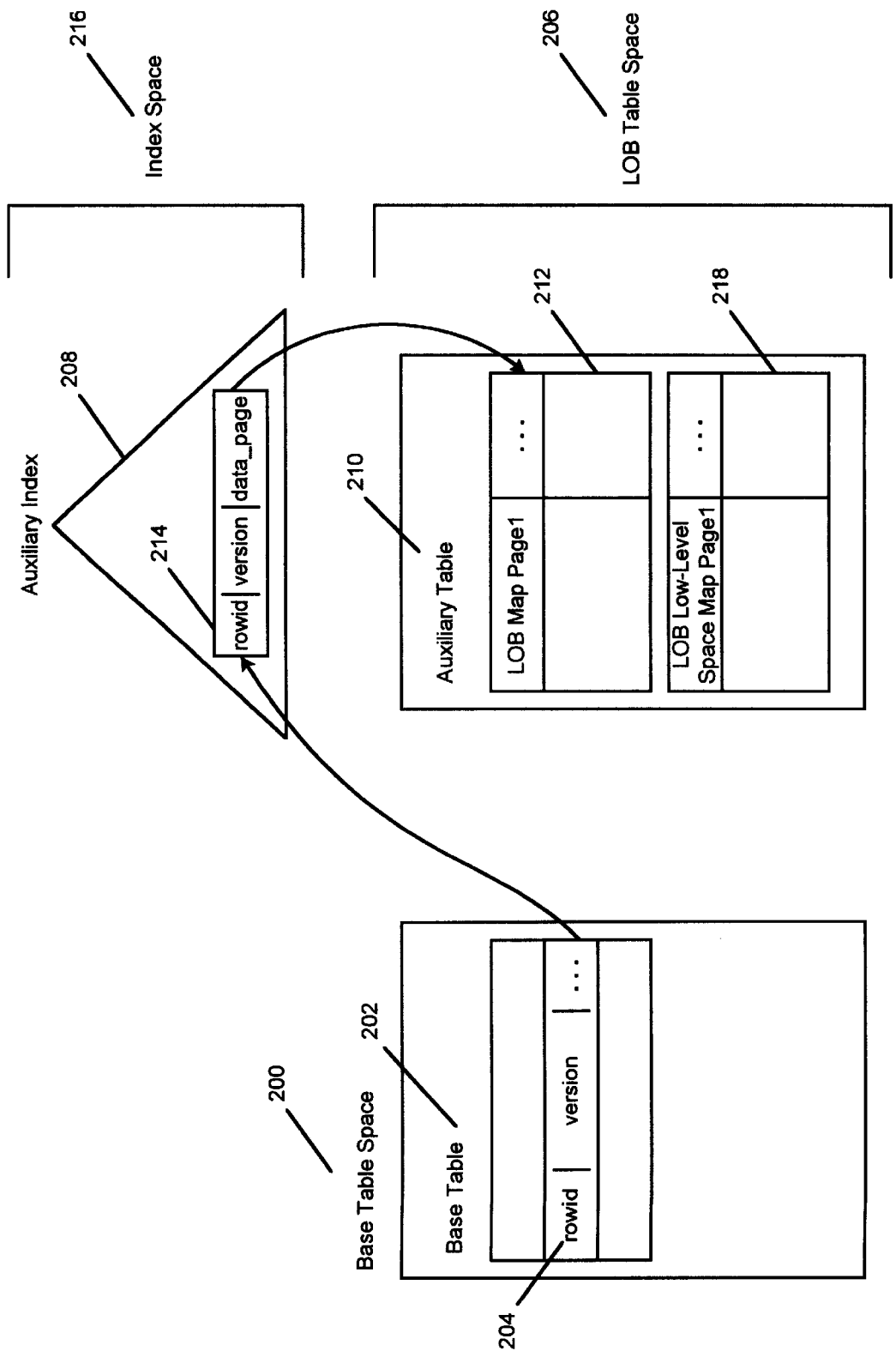
FIG. 2 is a block diagram illustrating an exemplary base table space and LOB table space.

FIG. 2 is a block diagram illustrating an exemplary base table space 200 and LOB table space 206. A base table space 200 contains a base table 202. The base table 202 is a table definition that logically contains rows and columns of data. For example, row 204 contains columns for a row identifier ("rowid"), a version number ("version"), and other columns (indicated with the ellipses). The inplace reorganization system 124 stores LOB values in LOB columns outside of the base table 202. The LOB columns may be stored outside of the base table 202, but they still are logically part of the base table 202. The LOB values are stored in a LOB table space 206 that is completely separate from the base table space 200 in which the base table 202 is defined.

The LOB table space 206 contains an auxiliary table 210. The inplace reorganization system 124 requires that users define an auxiliary table 210 within the LOB table space 206 to contain the actual LOB values. The auxiliary index 208 is created on the auxiliary table 210 in index space 216. The data manager 118 has been extended to find LOB values. In particular, the data manager 118 uses the auxiliary index 208 to quickly find the LOB values for a specific row. In particular, the auxiliary index contains keys 214, which indicate the first LOB map page, such as LOB Map Page1 212. The first LOB map page acts as a directory to the LOB map and LOB pages of a LOB and assists with accessing the LOB data. In addition to LOB Map pages, such as LOB Map Page1 212, the auxiliary table 210 contains LOB low-level space map pages, such as LOB Low-Level Space Map Page 1 218. LOB low-level space map pages assist in allocating and deallocating LOB pages. A high-level space map identifies the low-level space map pages.

Figure 3:
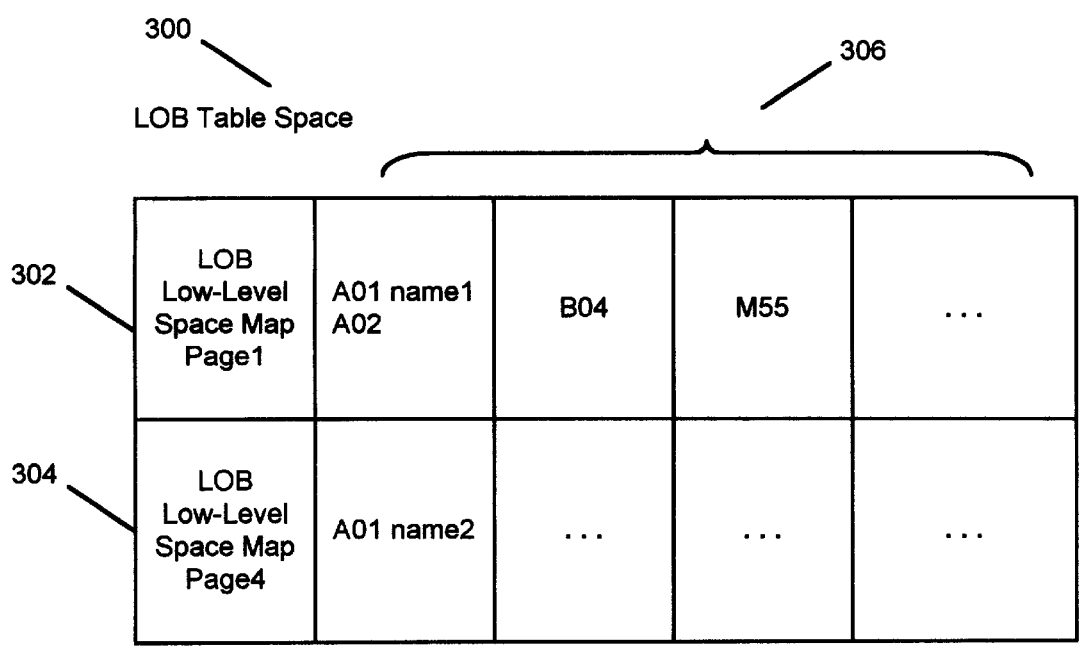
FIG. 3 is a block diagram illustrating an exemplary table space containing LOB low-level space map pages and LOB pages.

FIG. 3 is a block diagram illustrating an exemplary table space containing LOB low-level space map pages and LOB pages. A table space 300 contains a number of LOB low-level space map pages 302, 304, and each LOB low level space map page contains the allocation status of each LOB page covered by that LOB low level space map page. Each LOB low-level space map page 302, 304 covers a number of LOB pages 306. Each LOB page is allocated to one LOB, even if the LOB uses only a portion of the LOB page. For example, one LOB may be stored on 17 and a half LOB pages, but the LOB page that is half used is not allocated to any other LOB. Each LOB low-level space map page 302, 304 covers a fixed range of LOB pages 306. A LOB low-level space map page 302, 304 identifies the LOB pages 306 that have not yet been allocated to a LOB. When inserting a LOB, one or more LOB low-level space map pages 302, 304 are accessed to find LOB pages that may be allocated to the LOB. All LOB pages within a single table space have the same page size. A page may contain, for example, 4096 bytes.

Figure 4:
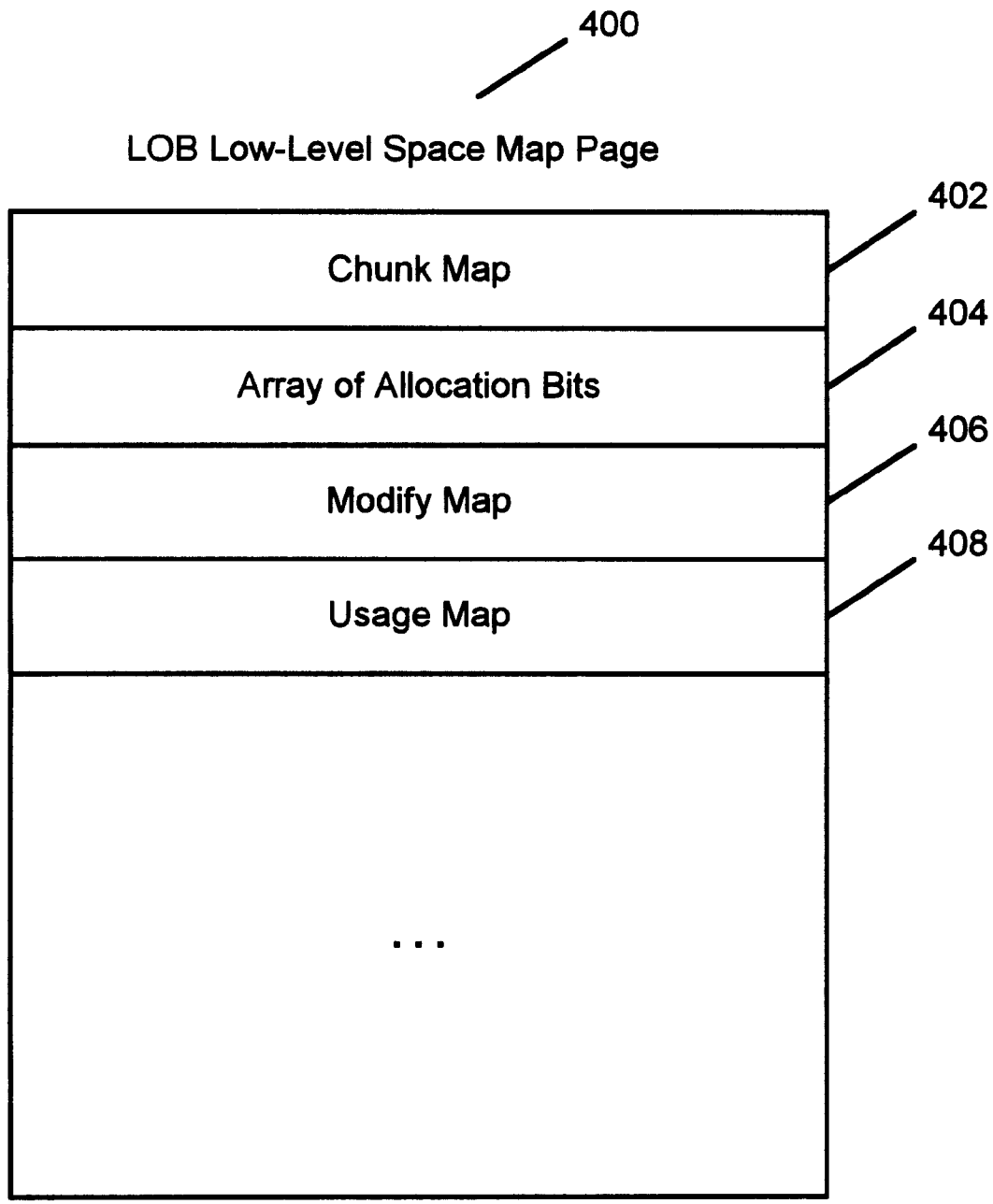
FIG. 4 is a block diagram illustrating an exemplary LOB low-level space map page.

FIG. 4 is a block diagram illustrating an exemplary LOB low-level space map page 400. LOB low-level space map page 400 contains a chunk map 402, an array of allocation bits 404, a modify map 406, a usage map 408, and other information, as indicated by the ellipses. The chunk map 402 is a series of two bit entries that indicate for each chunk whether that chunk is empty, partially used, fully used, or allocated to a single LOB. The array of allocation bits 404 has two bit entries that indicate whether each LOB page covered by the LOB low-level space map page 400 is unallocated, has been deallocated, is allocated, or is allocated and is the first page allocated to a LOB. The modification map 406 indicates for each page covered by the LOB low-level space map page 400 whether that page has been modified since the last time the page was copied. The usage map 408 has an entry for each page covered by the LOB low-level space map page 400. For each page, the usage map 408 provides a row identifier and version number to uniquely identify a LOB to which that page is allocated. Moreover, the usage map 408 indicates, for each page that is the first page allocated to a LOB, whether the LOB is well inserted or "perfectly chunked" (i.e., an organization state).

FIG. 5 is a block diagram illustrating an exemplary LOB map 500. For each LOB, the LOB map 500 identifies the starting page number for the LOB 502 (i.e., the first page allocated to the LOB) and the number of pages 504 allocated to the section. For example, the first page of a LOB may start at page 20 and has one page allocated to it. The next page of the LOB starts at page 1000 and has 16 pages allocated to it. Each LOB has one LOB map, which could be multiple LOB pages long. That is, each LOB map page contains the directory of pages that belong to one LOB.

Inplace Reorganization Technique

The basic reorganization can be considered a one pass technique. Initially, the inplace reorganization system 124 starts a forward and backward scan of all of the LOB low-level space map pages. In particular, the LOB low-level space map pages are prefetched using the prefetch page list (PFPL). During the forward scan of each space map page, the inplace reorganization system 124 identifies the free space within the LOB low-level space map page and maps this information into a free space list. The free space list is later used for efficient allocation and deallocation.

The free space list is used to manage the free space efficiently when allocating and deallocating pages. For each unique LOB space map, and for each chunk, free space list is used to identify the number of free pages within the chunk. The LOB low-level space map page list is used to locate LOB low-level space map pages and chunks when deallocating space. The free space page list is used to locate a chunk with the required amount of free pages. The singly linked lists may share common elements to facilitate maintenance of the lists.

Figure 6:
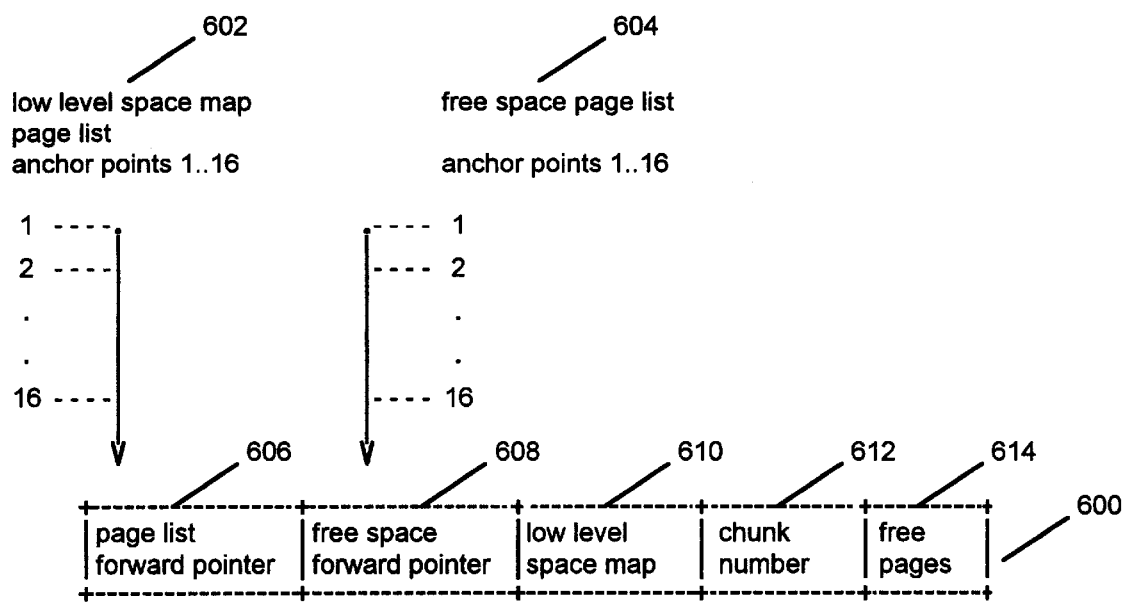
FIG. 6 is a block diagram illustrating an exemplary free space list.

FIG. 6 is a block diagram illustrating an exemplary free space list 600. Two lists 602 and 604 actually point to the free space list 600. The two lists are: a LOB low-level space map page list 602 and a free space page list 604. The LOB space map list 602 has entries (1–16), and each entry points to a page list forward pointer 606. The free space page list 604 has entries (1–16), and each entry points to a free space forward pointer 608. The free space list 600 provides information to identify a LOB space map 610, a chunk number 612 in that LOB space map, and the number of free pages 614 in that chunk. The inplace reorganization system uses the free space map 600 to locate free pages when chunking and rechunking LOBs.

While scanning the LOB low-level space map pages for free space, the inplace reorganization system 124 identifies LOBs that need to be rechunked. If a LOB needs to be rechunked, the inplace reorganization system 124 deallocates single page allocations and allocates full chunks to the LOB instead. Full chunk allocations are not deallocated. If the number of pages to be allocated to the LOB is not a multiple of chunk size (i.e., 16, 32, etc.), the last chunk, known as a partial chunk, consists of page allocations. The pages do not have to be contiguous within the partial chunk to provide efficient prefetching. After allocation, the inplace reorganization system 124 moves pages to free space in the front of a pageset to maintain the same logical order of the LOB, as will become more clear in the example discussed below.

After all of the LOBs are rechunked, there may still be gaps of free space between the allocated chunks and pages. Therefore, the inplace reorganization system 124 reclaims this free space. In particular, if sufficient free space exists within the pageset, the inplace reorganization system 124 starts reclaiming space by moving data from the last LOB low-level space map page to earlier ones. That is, the last LOB low-level space map pages are rechunked.

Rechunking of the LOB low-level space map pages uses the same process as rechunking a LOB from the beginning of the pageset, except that full chunk allocations are deallocated and then reallocated from the free space at the beginning of the pageset. In this manner, the inplace reorganization system 124 migrates the LOBs to the beginning of the pageset in an efficient manner and avoids moving pages twice. The inplace reorganization system 124 looks at the total amount of free space that has been accumulated in the free space list in determining when to move LOB pages from the end of the pageset forward.

The following pseudo code may be used by the inplace reorganization system 124 to reorganize LOB data inplace:

Build two prefetch page lists of all of the LOB low-level space map pages.
Start prefetch using the two prefetch page lists.
For each LOB low-level space map page in a set of LOB low-level space map pages,
    While scanning the LOB low-level space map page,
        If free space exists on the current LOB low-level space map page,
            Map the space into the free space list.
        Identify each LOB that needs to be rechunked.
    For each first LOB map page for the current LOB low-level space map page,
        If the LOB needs to be rechunked,
            Call RECHUNK_LOB to rechunk the LOB.
End
Log current LOB low-level space map page if required.
Release current LOB low-level space map page.
If one of the prefetch lists is empty,
    Fill that prefetch list with the next set of LOB low-level space map pages to be retrieved,
    Start prefetch on this filled prefetch list,
    Process the LOB low-level space map pages that have already been prefetched for the other prefetch list.
If there is sufficient free space to rechunk from the last LOB low-level space map page, Call BACK_SCAN to inspect the free space on the last LOB space map.
End.

Figure 7:
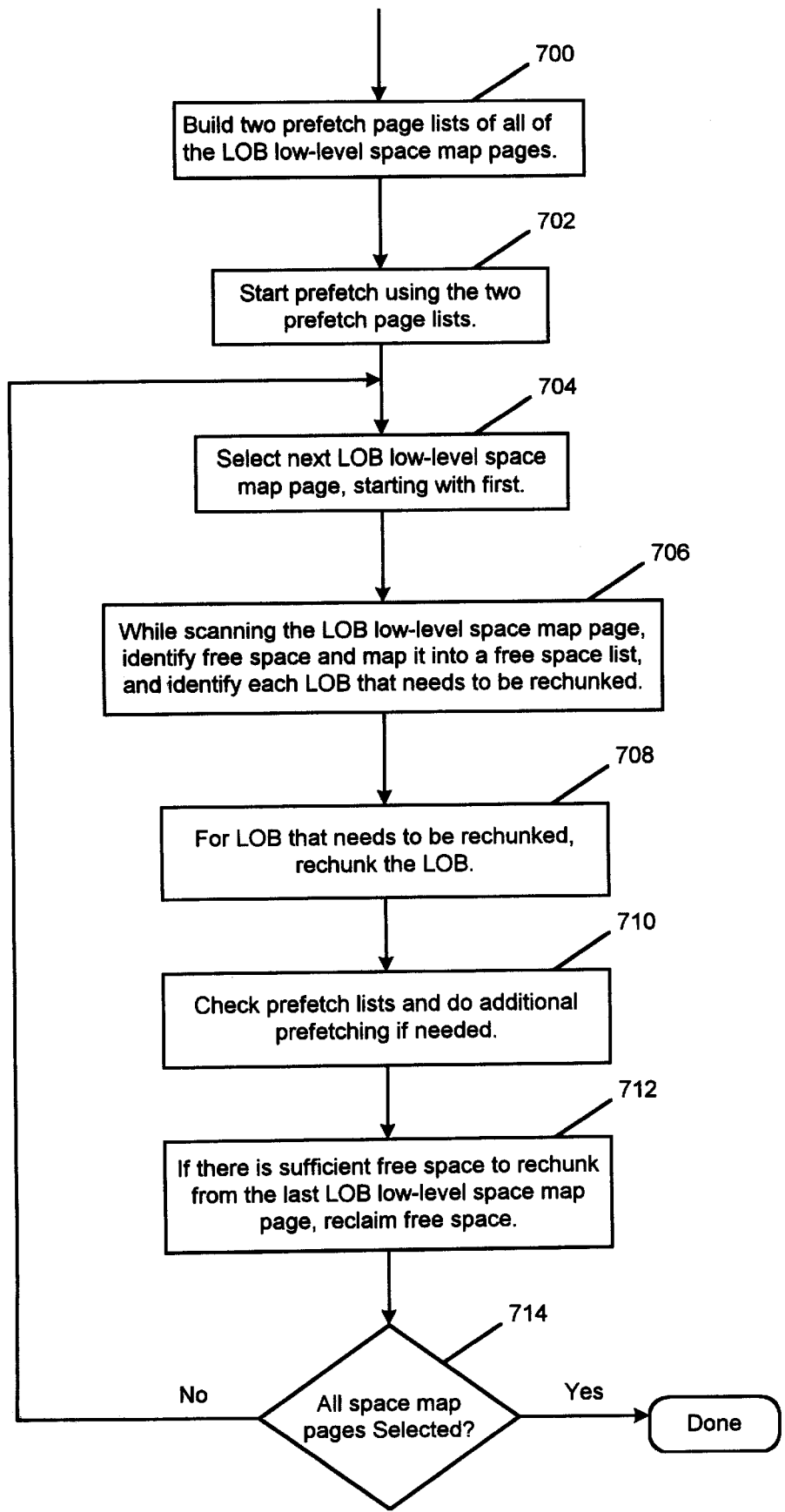
FIG. 7 is a flow diagram that represents the steps performed by the inplace reorganization system to reorganize LOB data inplace.

FIG. 7 is a flow diagram that represents the steps performed by the inplace reorganization system 124 to reorganize LOB data inplace. FIG. 7 reflects the pseudocode and will be used to further explain the above pseudocode.

In Block 700, the inplace reorganization system 124 builds two prefetch page lists of LOB low-level space map pages. In Block 702, the inplace reorganization system 124 issues prefetch commands to retrieve the pages identified in the prefetch page lists. In particular, the inplace reorganization system 124 identifies the LOB low-level space map pages to be retrieved with one prefetch list and issues a prefetch command to retrieve these pages. Also, the inplace reorganization system 124 identifies the pages to be retrieved with a second prefetch list and issues a prefetch command to retrieve these pages. When the pages retrieved using the first prefetch list have been processed, the inplace reorganization system 124 starts to process the pages retrieved using the second prefetch list. At the same time, the inplace reorganization system 124 identifies additional pages to be retrieved and places these into the first prefetch list and issues a prefetch command to retrieve these pages.

In Block 704, the inplace reorganization system 124 selects the next LOB low-level space map page that has been retrieved by prefetch, starting with the first one retrieved.

In Block 706, while scanning the LOB low-level space map page that has been selected, the inplace reorganization system 124 identifies free space and maps it into a free space list. Additionally, the inplace reorganization system 124 identifies each LOB that needs to be rechunked. The inplace reorganization system 124 identifies each LOB that needs to be rechunked based on an organization state that is stored in the usage map of the LOB space map.

In Block 708, the inplace reorganization system 124 rechunks each LOB that needs to be well inserted. That is, the inplace reorganization system 124 calls the RECHUNK_LOB procedure, discussed below, to perform rechunking. Then, if necessary, the inplace reorganization system 124 logs information about the LOB low-level space map page and releases the LOB low-level space map page.

In Block 710, the inplace reorganization system 124 checks the prefetch lists and does additional prefetching if needed. In Block 712, if there is sufficient free space to rechunk from the last LOB low-level space map page, the inplace reorganization system 124 reclaims free space. That is, after the rechunking is done for a LOB low-level space map page, the inplace reorganization system 124 calls the BACK_SCAN procedure, discussed below, to reclaim free space. In Block 714, the inplace reorganization system 124 determines whether all of the space map pages have been selected. If all of the space map pages have been selected, the inplace reorganization system 124 is done, otherwise, the inplace reorganization system 124 loops back to Block 704 to select the next LOB low-level space map page.

Figure 8:
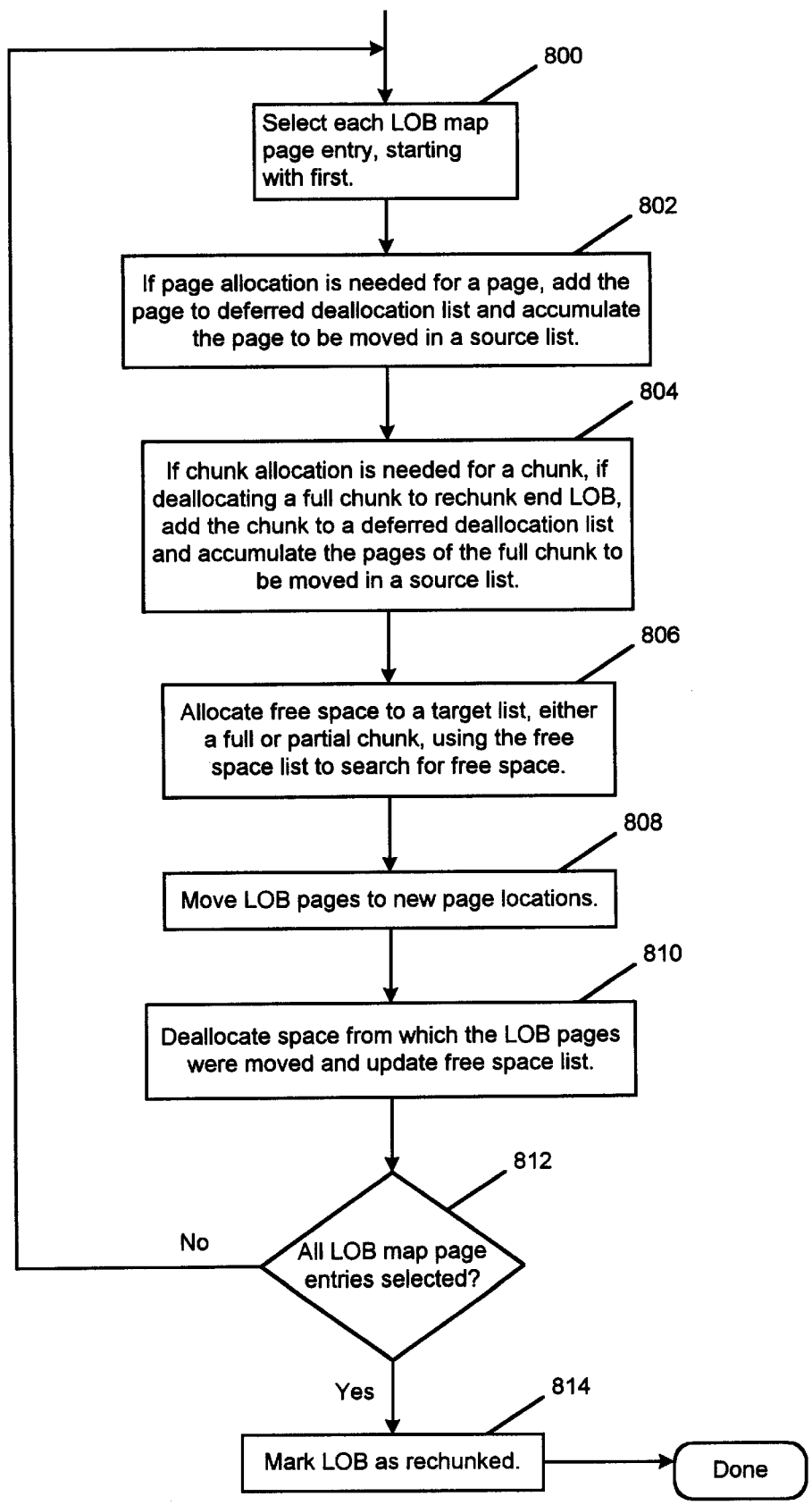
FIG. 8 is a flow diagram that represents the steps performed by the inplace reorganization system to rechunk LOB data.

The following pseudo code is used by the inplace reorganization system 124 to rechunk a LOB:

Procedure: RECHUNK_LOB
For each LOB map page entry,
    If rechunking and data page needs to be deallocated,
        Add the page to a deferred deallocation list,
        Accumulate the page to be moved in a source list.
    If rechunking and chunk needs to be deallocated,
        Add the chunk to a deferred deallocation list,
        Accumulate the pages of the full chunk to be moved in a source list.
    Allocate free space when required,
        Either a full or partial chunk,
        Search free space list for free space,
        Add allocated space to target list.
    Move LOB pages to new page locations (source to target lists).
    Deallocate space from which the LOB pages were moved and update free space list.
End
Mark LOB as rechunked.
End RECHUNK_LOB FIG. 8 is a flow diagram that represents the steps performed by the inplace reorganization system 124 to rechunk LOB data. FIG. 8 reflects the pseudocode for the RECHUNK_LOB procedure and will be used to further explain the above pseudocode. The inplace reorganization system 124 moves pages allocated to the LOB within the LOB table space so that the LOB is well inserted. Note that rechunking (deallocation/allocation) may not occur for some LOBs and may not start until it is known that the LOB needs to be rechunked.

To ensure that the LOB is well inserted, the inplace reorganization system 124 moves the data within the table space into chunks (i.e., 16 page groupings). The inplace reorganization system 124 also deallocates the pages from which the LOB data was moved and updates the free space list. The inplace reorganization system 124 marks the LOB as well inserted so that it will not be rechunked at another time (i.e., updates the "organization state"). Note that if the LOB were to be modified so that it were not well inserted (e.g., because of an update), then the LOB would be rechunked again, if necessary.

In Block 800, the inplace reorganization system 124 selects each LOB map page entry, starting with the first. Each LOB map page entry identifies a starting page number and the count of the number of pages in the section. In Block 802, if page allocation is needed for a page, the inplace reorganization system 124 adds the page to a deferred deallocation list and accumulates the page to be moved in a source list. In Block 804, if chunk allocation is needed for a chunk (e.g., when reclaiming free space), the inplace reorganization system 124 adds the chunk to a deferred deallocation list and accumulates the pages of the full chunk to be moved in a source list. In Block 806, the inplace reorganization system 124 allocates free space to a target list using the free space list to search for free space. The allocated free space can be either a full or partial chunk.

In Block 808, the inplace reorganization system 124 moves the LOB pages to new page locations. In Block 810, the inplace reorganization system 124 deallocates space from which the LOB pages were moved and updates the free space list. In Block 812, the inplace reorganization system 124 determines whether all of the LOB map page entries have been selected. If all of the LOB map page entries have been selected, the inplace reorganization system 124 continues to Block 814, otherwise, the inplace reorganization system 124 loops back to Block 800 to select the next LOB map page entry. In Block 814, the inplace reorganization system 124 marks the LOB as rechunked by updating the "organization state".

Figure 9C:
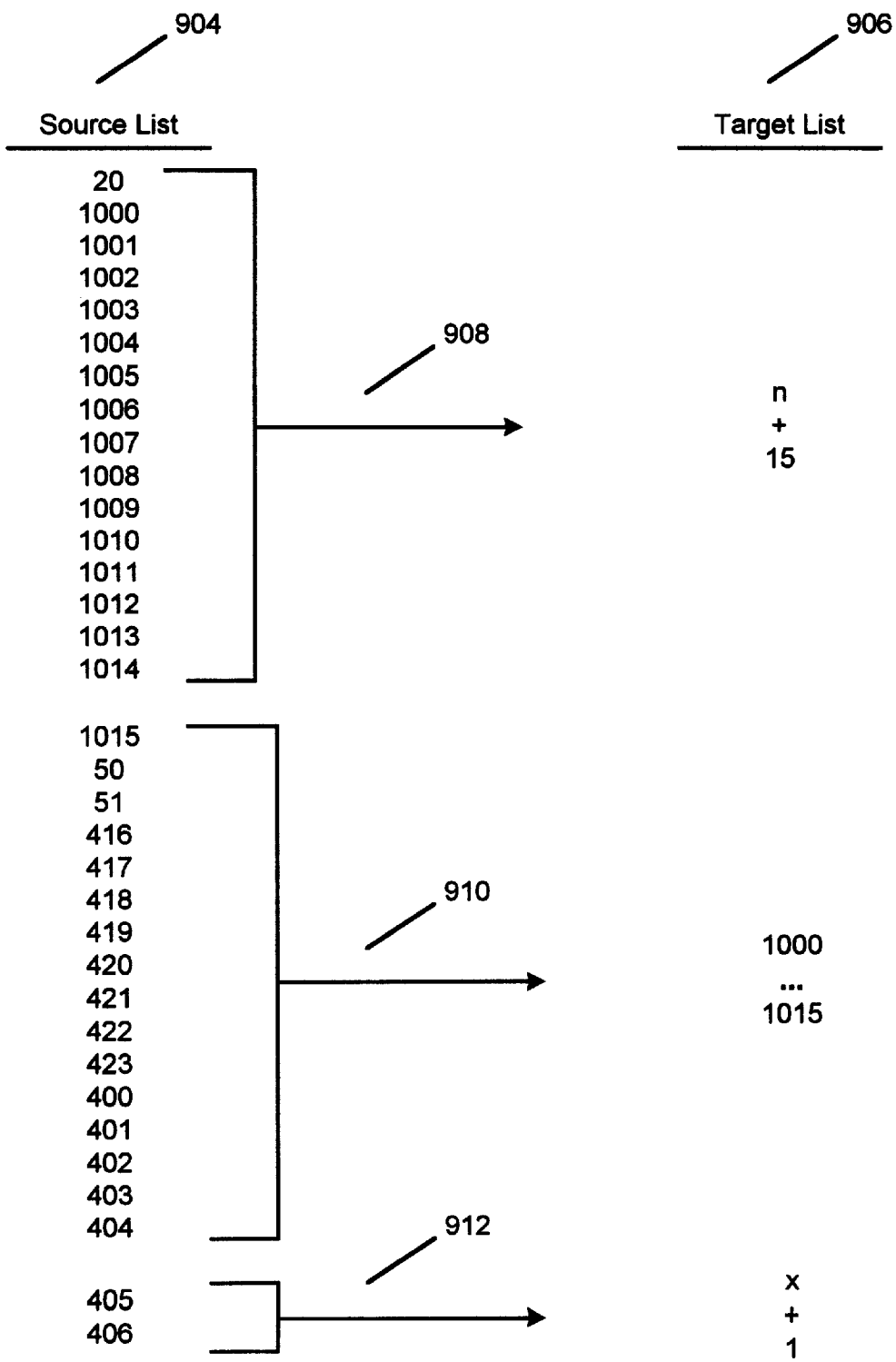

FIGS. 9A–9D are diagrams illustrating an example of rechunking. Initially, as shown in table 900 in FIG. 9A, a LOB is allocated to 34 pages, with one page starting at page 20, with 16 pages (i.e., a chunk) starting at page 1000, with two pages starting at page 50, with eight pages starting at page 416, and with seven pages starting at page 400. This LOB has not been reorganized, and the pages allocated to the LOB are logically represented as shown in FIG. 9A.

To start reorganization, the inplace reorganization system 124 looks at the page that is the first page allocated to the LOB, which is page 20 with one page. At this time, the inplace reorganization system 124 cannot determine whether rechunking is necessary. For example, if page 20 is the only page allocated to the LOB, rechunking is not necessary. Next, the inplace reorganization system 124 looks at page 1000 and notes that this is a chunk. Still, rechunking is not needed because if only these pages were allocated to the LOB, the LOB would be well inserted. When the inplace reorganization system 124 sees that there are two pages starting at page 50, the inplace reorganization system 124 recognizes that the page starting at page 20 could be combined with the pages starting at page 50, and so rechunking is required.

At this time, the inplace reorganization system 124 adds page 20 and page 50 to the deferred deallocation list 902 shown in FIG. 9B. The deallocation of the original pages to which the LOB is allocated is deferred until at least 16 pages are in the list. Then, a chunk can be allocated for the 16 pages, the data in the original individual pages can be moved into the chunk, and the original pages can be deallocated. The allocation is done by using the free space list. If the free space list does not have enough free space, the inplace reorganization system 124 used traditional allocation mechanisms to allocate a chunk.

Additionally, the inplace reorganization system 124 adds the pages allocated to the LOB to the source list 904 illustrated in FIG. 9C. The source list 904 identifies the pages on which data will be moved to newly allocated space identified in a target list 906, illustrated in FIG. 9D.

The inplace reorganization system 124 continues to process the pages in FIG. 9A until the deferred deallocation list 902 contains pages 20, 50, 51, 416–424, and 400–406. At this time, there are 18 pages in the deferred deallocation list 902, and a chunk can be allocated.

Initially, a chunk, represented with the "n+15" in FIG. 9C is allocated. The data in pages 20 and 1000–1014 (i.e., 16 pages) is moved to the newly allocated chunk ("n+15"), as represented with arrow 908. Then, the next 16 pages of data are moved to the chunk made up of pages 1000–1015, as represented with arrow 910. The chunk comprised of pages 1000–1015 is reused by the inplace reorganization system 124. The inplace reorganization system 124 shifts data to avoid requesting another chunk, which requires additional processing time. Then, the last two pages of the LOB receive page allocations as represented by "x+1" in FIG. 9C. The last two pages of the LOB are moved to these pages, as represented by arrow 912.

FIG. 9D illustrates a table 914 showing the results of the reorganization. After reorganization, the same LOB is allocated to a different grouping of 34 pages. This new allocation results in the LOB being allocated to two full chunks and one partial chunk. The LOB of 34 pages is now inserted into the table space as two chunks, one starting at page 300 and one starting at page 1000, and two additional pages starting at page 600.

Figure 10:
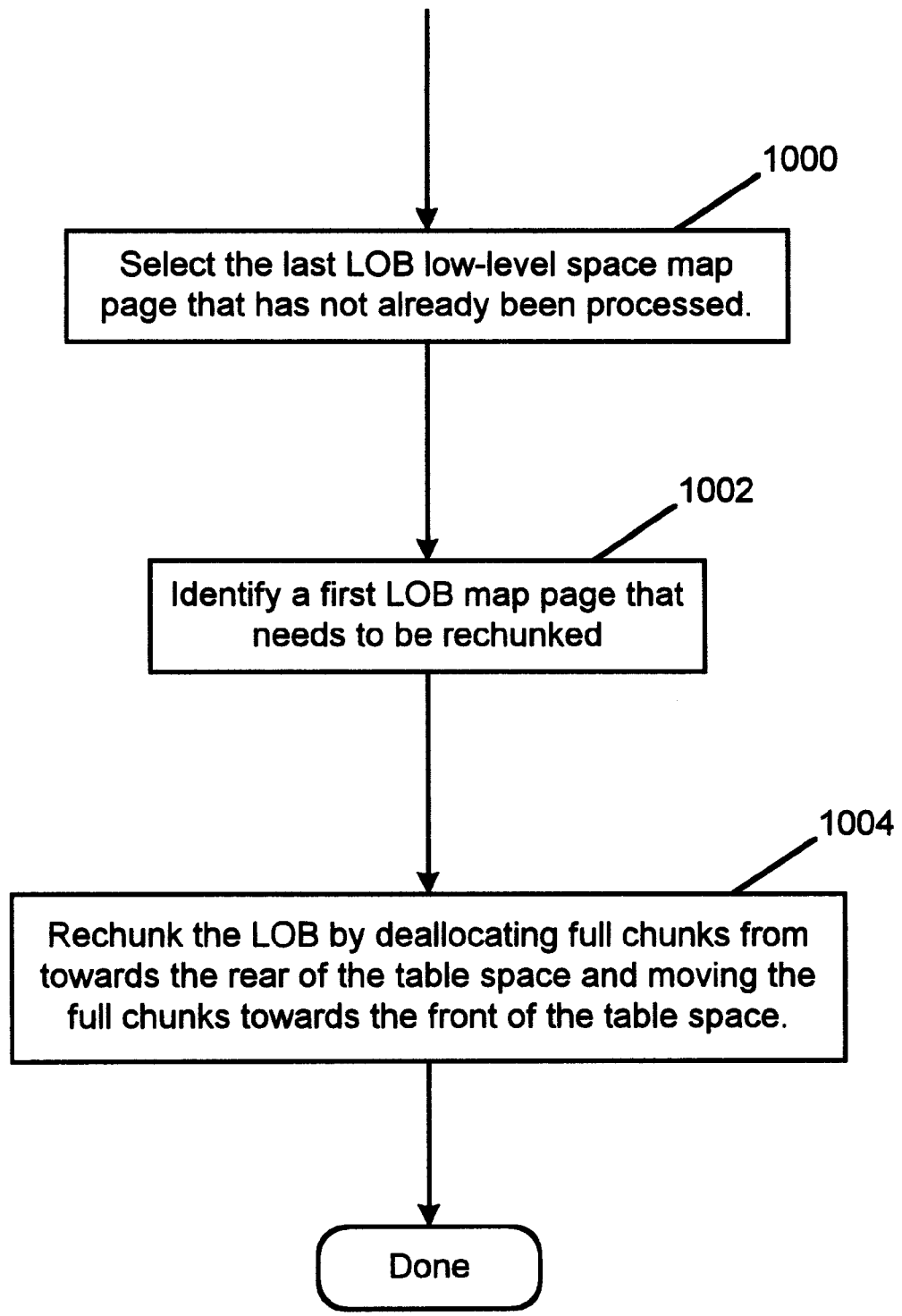
FIG. 10 is a flow diagram that represents the steps performed by the inplace reorganization system to reclaim free space.

The following pseudo code is used by the inplace reorganization system 124 to move rechunked LOBs:

Procedure: BACK_SCAN
   Select last LOB low-level space map page not already processed.
   Identify a first LOB map page that needs rechunking.
   Call RECHUNK_LOB to rechunk LOB by deallocating full chunks.
End BACK_SCAN FIG. 10 is a flow diagram that represents the steps performed by the inplace reorganization system 124 to reclaim free space. FIG. 10 reflects the pseudocode for the BACK_SCAN procedure and will be used to further explain the above pseudocode.

In Block 1000, the inplace reorganization system 124 selects the last LOB low-level space map page that has not already been processed. In Block 1002, the inplace reorganization system 124 identifies a first LOB map page that needs to be rechunked. In Block 1004, the inplace reorganization system 124 rechunks the LOB by calling the RECHUNK_LOB procedure to deallocate full chunks towards the end of the table space, as identified by the last LOB low-level space map page, and allocate these full chunks towards the front of the table space. Thus, the inplace reorganization system 124 reclaims free space at the end of the LOB table space.

Figure 11:
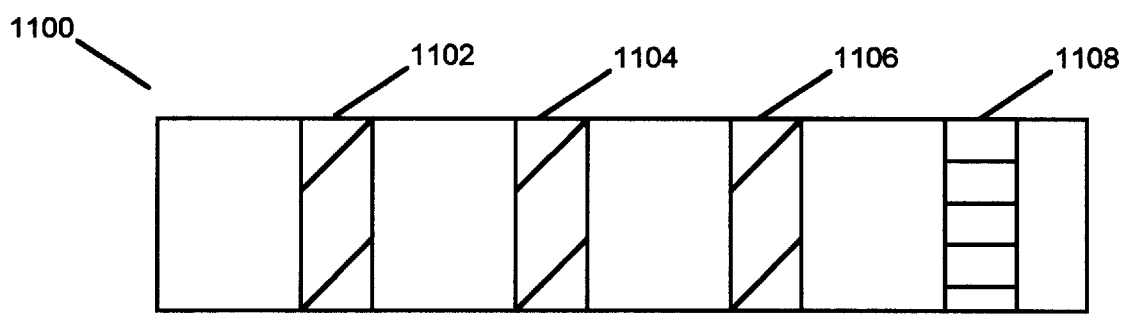
FIG. 11 is a diagram illustrating how the pages in LOB table space may look after some LOBs have been rechunked.

FIG. 11 is a diagram illustrating how the pages in LOB table space 1100 may look after some LOBs have been rechunked. There may be free space, such as 1102, 1104, and 1106 near the beginning of the table space 1100. Then, there may be data 1108 to be rechunked towards the end of the table space 1100. The inplace reorganization system 124 reclaims the free space 1102, 1104, and 1106 by rechunking LOBs toward the end of the table space 1100 into the free space 1102, 1104, and 1106 at the beginning of the table space 1100.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of reorganizing a database stored on a data storage device connected to a computer, the method comprising the steps of:

identifying large object data that needs to be reorganized within a table space;

allocating one or more chunks in the table space to the identified large object data based on pages of the large object data that are not allocated to full chunks and wherein a chunk comprises a set amount of space; and moving pages of the large object data into the allocated chunks to reorganize the large object data inplace, so that the large object data is allocated to as few chunks as possible.

2. The method of claim 1, further comprising the step of reclaiming free space at an end of the table space.

3. The method of claim 1, wherein the one or more chunks comprise zero or more full chunks and at most one partial chunk.

4. A method of reorganizing a database stored on a data storage device connected to a computer, the method comprising the steps of:

identifying large object data that needs to be reorganized within a table space by identifying large object data comprised of pages that are allocated to partial chunks of space;

allocating a combination of full and partial chunks of space within the table space to contain the reorganized large object data;

moving the large object data into the allocated chunks of space to reorganize the large object data inplace, wherein the inplace reorganization is performed without unloading and reloading the large object data in the table space; and reclaiming free space at an end of the table space.

5. The method of claim 4, wherein the step of identifying the large object data that needs to be reorganized further comprises the step of identifying large object data that is not allocated to zero or more full chunks of space and at most one partial chunk of space.

6. The method of claim 5, wherein the step of identifying further comprises the step of searching low-level space map pages.

7. The method of claim 6, further comprising the step of tracking free space encountered while searching the low-level space map pages.

8. The method of claim 6, further comprising the step of prefetching low-level space map pages.

9. The method of claim 6, wherein the large object data is comprised of one or more large objects, further comprising the step of locating a first page of each large object on which that large object is stored.

10. The method of claim 4, wherein a full chunk is comprised of a fixed number of pages.

11. The method of claim 4, wherein the combination comprises zero or more full chunks.

12. The method of claim 4, wherein combination comprises at most one partial chunk of space.

13. The method of claim 4, wherein the step of identifying further comprises the step of tracking free space encountered while searching low-level space map pages to identify the large object data that needs to be reorganized and wherein the step of allocating chunks of space further comprises the step of first searching the tracked space.

14. The method of claim 4, wherein the step of allocating chunks of space further comprises the step of searching space map pages.

15. The method of claim 4, wherein the step of moving further comprises the step of moving all of the large object data into the allocated chunks of space.

16. The method of claim 4, wherein the step of moving further comprises the step of moving a portion of the large object data into the allocated chunks of space.

17. The method of claim 4, further comprising the step of deallocating the space from which the large object data was moved.

18. The method of claim 4, wherein the large object data is comprised of one or more large objects and wherein the step of reclaiming free space further comprises the step of moving a last large object from the end of the table space to a different portion of the table space.

19. The method of claim 18, further comprising the step of scanning low-level space map pages in reverse order to locate a first page on which the last large object is stored.

20. The method of claim 18, further comprising the step of determining whether the last large object can be moved.

21. The method of claim 20, wherein the step of identifying further comprises the step of tracking free space encountered while searching low-level space map pages to identify large objects that need to be reorganized and wherein the step of determining whether the last large object can be moved further comprises the step of calculating whether the last large object fits in the tracked free space.

22. The method of claim 20, wherein the step of identifying further comprises the step of tracking free space encountered while searching low-level space map pages to identify large objects that need to be reorganized and wherein the step of determining whether the last large object can be moved further comprises the step of calculating whether the last large object fits in the tracked free space while leaving a portion of the free space unused.

23. The method of claim 18, wherein the step of identifying further comprises the step of tracking free space encountered while searching low-level space map pages to identify large objects that need to be reorganized and further comprising the step of moving the last large object into the tracked free space.

24. The method of claim 23, further comprising the step of deallocating the space from which the last large object was moved.

25. An apparatus for reorganizing a database, comprising:

a computer having a data storage device connected thereto, wherein the data storage device stores the database;

one or more computer programs, performed by the computer, for identifying large object data that needs to be reorganized within a table space, allocating one or more chunks in the table space to the identified large object data based on pages of the large object data that are not allocated to full chunks and wherein a chunk comprises a set amount of space, and moving pages of the large object data into the allocated chunks to reorganize the large object data inplace, so that the large object data is allocated to as few chunks as possible.

26. The apparatus of claim 25, further comprising means for reclaiming free space at an end of the table space.

27. The apparatus of claim 25, wherein the one or more chunks comprise zero or more full chunks and at most one partial chunk.

28. An apparatus for reorganizing a database, comprising:
a computer having a data storage device connected thereto, wherein the data storage device stores the database;
one or more computer programs, performed by the computer, for identifying large object data that needs to be reorganized within a table space by identifying large object data comprised of pages that are allocated to partial chunks of space, allocating a combination of full and partial chunks of space within the table space to contain the reorganized large object data, moving the large object data into the allocated chunks of space to reorganize the large objects data inplace, wherein the inplace reorganization is performed without unloading or reloading the large object data in the table space, and reclaiming free space at an end of the table space.

29. The apparatus of claim 28, wherein the means for identifying the large object data that needs to be reorganized further comprises the means for identifying large object data that is not allocated to zero or more full chunks of space and at most one partial chunk of space.

30. The apparatus of claim 29, wherein the means for identifying further comprises the means for searching low-level space map pages.

31. The apparatus of claim 30, further comprising the means for tracking free space encountered while searching the low-level space map pages.

32. The apparatus of claim 30, further comprising the means for prefetching low-level space map pages.

33. The apparatus of claim 30, wherein the large object data is comprised of one or more large objects, further comprising the means for locating a first page of each large object on which that large object is stored.

34. The apparatus of claim 28, wherein a full chunk is comprised of a fixed number of pages.

35. The apparatus of claim 28, wherein the combination comprises zero or more full chunks.

36. The apparatus of claim 28, wherein combination comprises at most one partial chunk of space.

37. The apparatus of claim 28, wherein the means for identifying further comprises the means for tracking free space encountered while searching low-level space map pages to identify the large object data that needs to be reorganized and wherein the means for allocating chunks of space further comprises the means for first searching the tracked space.

38. The apparatus of claim 28, wherein the means for allocating chunks of space further comprises the means for searching space map pages.

39. The apparatus of claim 28, wherein the means for moving further comprises the means for moving all of the large object data into the allocated chunks of space.

40. The apparatus of claim 28, wherein the means for moving further comprises the means for moving a portion of the large object data into the allocated chunks of space.

41. The apparatus of claim 28, further comprising the means for deallocating the space from which the large object data was moved.

42. The apparatus of claim 28, wherein the large object data is comprised of one or more large objects and wherein the means for reclaiming free space further comprises the means for moving a last large object from the end of the table space to a different portion of the table space.

43. The apparatus of claim 42, further comprising the means for scanning low-level space map pages in reverse order to locate a first page on which the last large object is stored.

44. The apparatus of claim 42, further comprising the means for determining whether the last large object can be moved.

45. The apparatus of claim 44, wherein the means for identifying further comprises the means for tracking free space encountered while searching low-level space map pages to identify large objects that need to be reorganized and wherein the means for determining whether the last large object can be moved further comprises the means for calculating whether the last large object fits in the tracked free space.

46. The apparatus of claim 44, wherein the means for identifying further comprises the means for tracking free space encountered while searching low-level space map pages to identify large objects that need to be reorganized and wherein the means for determining whether the last large object can be moved further comprises the means for calculating whether the last large object fits in the tracked free space while leaving a portion of the free space unused.

47. The apparatus of claim 42, wherein the means for identifying further comprises the means for tracking free space encountered while searching low-level space map pages to identify large objects that need to be reorganized and further comprising the means for moving the last large object into the tracked free space.

48. The apparatus of claim 47, further comprising the means for deallocating the space from which the last large object was moved.

49. An article of manufacture comprising a computer program carrier readable by a computer and embodying one or more instructions executable by the computer to perform method steps for reorganizing a database stored in a data storage device connected to the computer, the method comprising the steps of:
identifying large object data that needs to be reorganized within a table space;
allocating one or more chunks in the table space to the identified large object data based on pages of the large object data that are not allocated to full chunks and wherein a chunk comprises a set amount of space; and
moving pages of the large object data into the allocated chunks to reorganize the large object data inplace, so that the large object data is allocated to as few chunks as possible.

50. The article of manufacture of claim 49, further comprising the step of reclaiming free space at an end of the table space.

51. The article of manufacture of claim 49, wherein the one or more chunks comprise zero or more full chunks and at most one partial chunk.

52. An article of manufacture comprising a computer program carrier readable by a computer and embodying one or more instructions executable by the computer to perform method steps for reorganizing a database stored in a data storage connected to the computer, the method comprising the steps of:

identifying large object data that needs to be reorganized within a table space by identifying large object data comprised of pages that are allocated to partial chunks of space;

allocating a combination of full and partial chunks of space within the table space to contain the reorganized large object data;

moving the large object data into the allocated chunks of space to reorganize the large object data inplace, wherein the inplace reorganization is performed without unloading or reloading the large object data in the table space; and reclaiming free space at an end of the table space.

53. The article of manufacture of claim 52, wherein the step of identifying the large object data that needs to be reorganized further comprises the step of identifying large object data that is not allocated to zero or more full chunks of space and at most one partial chunk of space.

54. The article of manufacture of claim 53, wherein the step of identifying further comprises the step of searching low-level space map pages.

55. The article of manufacture of claim 54, further comprising the step of tracking free space encountered while searching the low-level space map pages.

56. The article of manufacture of claim 54, further comprising the step of prefetching low-level space map pages.

57. The article of manufacture of claim 54, wherein the large object data is comprised of one or more large objects, further comprising the step of locating a first page of each large object on which that large object is stored.

58. The article of manufacture of claim 52, wherein a full chunk is comprised of a fixed number of pages.

59. The article of manufacture of claim 52, wherein the combination comprises zero or more full chunks.

60. The article of manufacture of claim 52, wherein combination comprises at most one partial chunk of space.

61. The article of manufacture of claim 52, wherein the step of identifying further comprises the step of tracking free space encountered while searching low-level space map pages to identify the large object data that needs to be reorganized and wherein the step of allocating chunks of space further comprises the step of first searching the tracked space.

62. The article of manufacture of claim 52, wherein the step of allocating chunks of space further comprises the step of searching space map pages.

63. The article of manufacture of claim 52, wherein the step of moving further comprises the step of moving all of the large object data into the allocated chunks of space.

64. The article of manufacture of claim 52, wherein the step of moving further comprises the step of moving a portion of the large object data into the allocated chunks of space.

65. The article of manufacture of claim 52, further comprising the step of deallocating the space from which the large object data was moved.

66. The article of manufacture of claim 52, wherein the large object data is comprised of one or more large objects and wherein the step of reclaiming free space further comprises the step of moving a last large object from the end of the table space to a different portion of the table space.

67. The article of manufacture of claim 66, further comprising the step of scanning low-level space map pages in reverse order to locate a first page on which the last large object is stored.

68. The article of manufacture of claim 66, further comprising the step of determining whether the last large object can be moved.

69. The article of manufacture of claim 68, wherein the step of identifying further comprises the step of tracking free space encountered while searching low-level space map pages to identify large objects that need to be reorganized and wherein the step of determining whether the last large object can be moved further comprises the step of calculating whether the last large object fits in the tracked free space.

70. The article of manufacture of claim 68, wherein the step of identifying further comprises the step of tracking free space encountered while searching low-level space map pages to identify large objects that need to be reorganized and wherein the step of determining whether the last large object can be moved further comprises the step of calculating whether the last large object fits in the tracked free space while leaving a portion of the free space unused.

71. The article of manufacture of claim 66, wherein the step of identifying further comprises the step of tracking free space encountered while searching low-level space map pages to identify large objects that need to be reorganized and further comprising the step of moving the last large object into the tracked free space.

72. The article of manufacture of claim 71, further comprising the step of deallocating the space from which the last large object was moved.

* * * * *